May 21, 1940.    R. S. RICHARDSON    2,201,958
PREHEATING AMMONIA-AIR MIXTURES
Filed Dec. 4, 1937
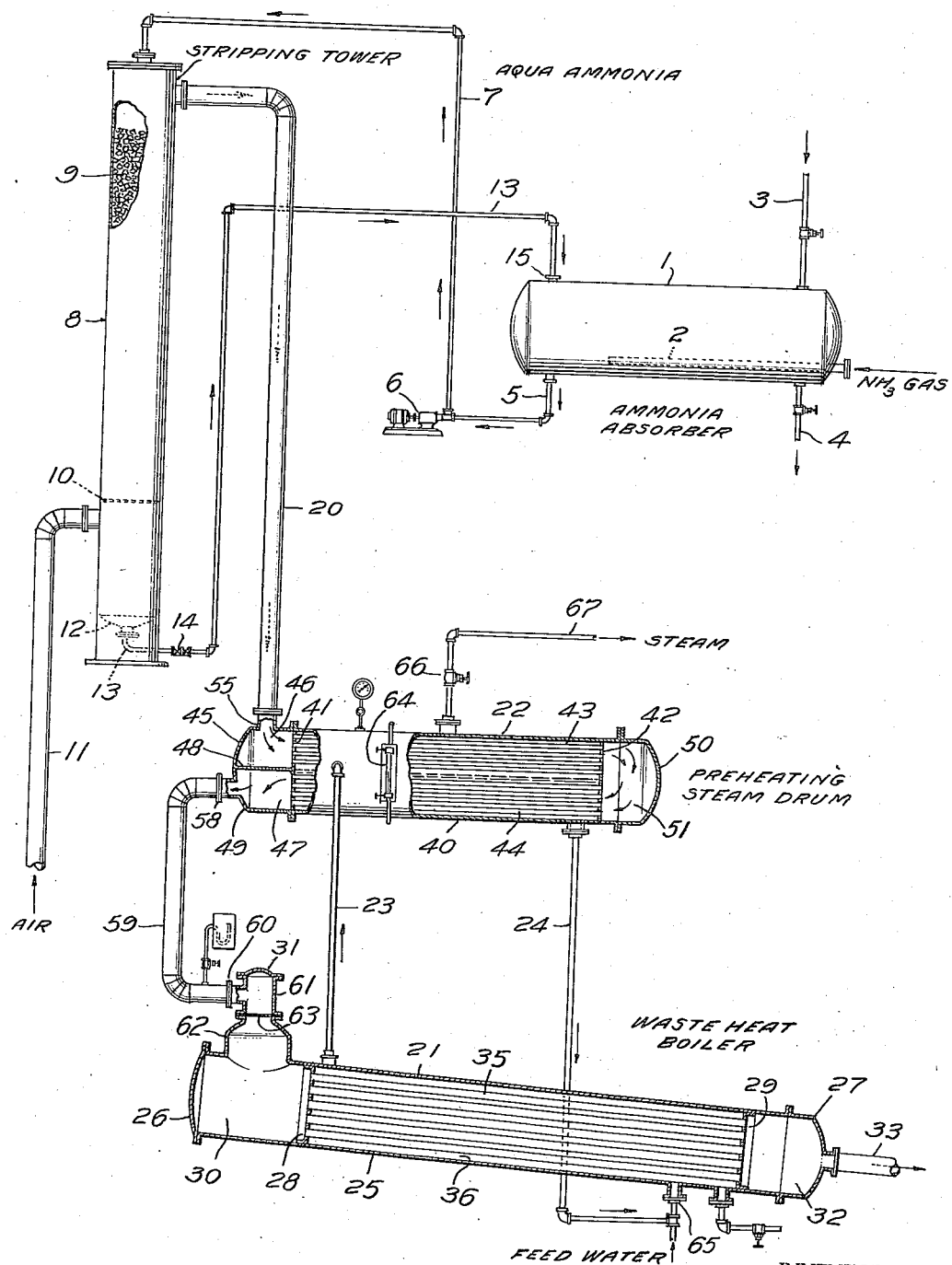
INVENTOR.
RALPH S. RICHARDSON,
BY Wm. P. Spielman
ATTORNEY.

Patented May 21, 1940

2,201,958

UNITED STATES PATENT OFFICE 2,201,958

PREHEATING AMMONIA-AIR MIXTURES

Ralph S. Richardson, Scarsdale, N. Y., assignor to Chemical Construction Corporation, New York, N. Y., a corporation of Delaware Application December 4, 1937, Serial No. 178,137

4 Claims. (Cl. 23—288)

This invention relates to a method and apparatus for preheating an ammonia-air mixture for oxidation to oxides of nitrogen, and more particularly to a method and apparatus for preheating such gases by the indirect transfer thereto of the heat of hot gases from the ammonia oxidation.

Objects of the invention are to provide a new, more flexible, and safer method for controlling the amount of preheating to be given the gases on their way to the ammonia burner, and to provide a new and improved burner and waste heat boiler that is especially adapted for carrying out the above process.

It is well known that careful control of the preheating of an ammonia-air mixture is necessary before oxidizing it with a platinum or platinum-rhodium gauze. To obtain a 95–96% conversion with a high through-put of ammonia at the burner the ammonia-air mixture must be preheated, but care must be taken that no pre-ignition, or pre-oxidation of the ammonia to nitrogen and water vapor, takes place.

Heretofore it has been the practice to pass the incoming ammonia-air mixture through a heat exchanger of soft steel in direct heat exchange relation with the extremely hot oxides of nitrogen leaving the ammonia burner. When an ammonia-air mixture is preheated in this manner there is great danger of pre-ignition and decomposition of the ammonia by hot spots in the heat exchanger, particularly in pressure plants where the ammonia-air mixture is preheated under pressure. Moreover, a direct heat exchanger of this type is relatively inflexible and when once designed for a definite amount of heat transfer it cannot easily be changed to return to the incoming gases a different proportion of its total heat. This is a serious objection in pressure plants where fluctuations in the operating pressures may be encountered or changes in the ammonia-air ratio may be desirable. It is a further object of the present invention to provide a type of heat transfer from the hot gases leaving the ammonia burner to the incoming ammonia-air mixture which cannot create hot spots in the heat exchanger and which is capable of close and exact adjustment of the rate of heat transfer through a wide range of temperatures.

In accordance with the invention, the hot nitric oxide gases from the ammonia-air burner are passed through a waste heat boiler containing water and their heat is caused to generate steam. The cold ammonia-air mixture on its way to the ammonia burner is then passed into heat exchange relation with this steam, whereby the mixture is preheated to the proper temperature for oxidation. By simple regulation of the pressure of the steam the temperature of the ammonia-air mixture entering the ammonia burner is easily controlled, and more uniform operating results are thereby obtainable.

While the invention in its broader aspects includes the use of any suitable type of waste heat boiler, a more limited and preferred modification thereof is directed to the use of a boiler which is especially adapted for the purpose. In the accompanying drawing, the single figure shows a diagrammatic outline of an embodiment of the invention in which a boiler having a preheating steam drum is illustrated. It is understood, however, that this embodiment of the invention is given by way of illustration, and that the invention in its broader aspects is not limited thereto.

Referring to the drawing, a system for preparing an ammonia-air mixture of relatively constant composition is shown at the upper part thereof. This system includes an aqua-ammonia tank 1 provided with a perforated ammonia gas pipe 2 near the bottom thereof and a water inlet pipe 3 and a drain pipe 4. An outlet pipe 5 for the aqua-ammonia solution of substantially the correct concentration for the desired ammonia-air mixture leads to a pump 6, from which the solution is elevated through the pipe 7 and sprayed into the top of stripping tower 8.

The tower 8 is provided with packing 9 supported on a suitable perforated grid 10, and below this grid compressed air is introduced through a pipe 11 from an air compressor (not shown). At the base of the tower 8 is a basin 12 from which a drain pipe 13, provided with a suitable pressure reducing valve 14, leads back to the tank 1 through inlet 15. The pump 6 is capable of supplying aqua-ammonia to the tower 8 at a rate that is greatly in excess of its stripping capacity, and accordingly the aqua-ammonia returned through the line 13 is only of slightly lower strength than that introduced into the tower through the pipe 7. By suitable adjustment of the rate of air flow, it is easy to maintain a close control of the ammonia-air ratio leaving the top of the tower 8.

The ammonia-air mixture formed in the tower 8 is taken off through the pipe 20 and, in accordance with the present invention, is preheated to a temperature corresponding to the steam pressure carried by the boiler by heat exchange with high pressure steam that is generated in a waste heat boiler. In the embodiment of the invention shown, a combined ammonia burner and waste heat boiler of a novel type is illustrated, the construction of which is as follows:

The boiler consists generally of a lower water or boiler drum 21 and an upper preheating steam drum 22, together with riser and downflow lines 23 and 24 respectively. The water drum 21 is of tubular construction and consists of an outer cylindrical shell 25 having front and rear end pieces 26 and 27 and forward and rear tube sheets 28 and 29. The forward tube sheet 28 is welded or otherwise attached within the cylindrical shell 25 some distance from the front end piece 26, and forms therewith a gas inlet header 30 for the introduction of hot gases from an ammonia burner 31, the construction of which will be subsequently described. The rear tube sheet 29 is mounted across the cylindrical shell 25 near the end piece 27 and forms therewith a gas outlet header 32 which is in communication with a gas outlet pipe 33. Between the forward and rear headers 28 and 29 are a plurality of tubes 35 which may be welded or expanded into the tube sheets in the usual manner of boiler construction and function as fire tubes to carry the hot gases from the gas inlet header 30 in heat exchange relation with water contained in the boiler space 36 between the tubes.

The upper steam drum 22 is of smaller size than the water drum 21 and is of novel construction, since it combines the functions of a steam drum and a heat exchanger. The steam drum proper consists of a cylindrical outer section 40 with forward and rear tube sheets 41 and 42 welded or otherwise attached thereto, which tube sheets have upper and lower banks of heat exchange tubes 43 and 44 extending therebetween. At one end of the steam drum is a flanged header section 45, which is divided into upper and lower gas inlet and gas outlet headers 46 and 47 by a horizontal partition 48, which makes a gas tight fit between the front wall 49 of the header section and the tube sheet 41. At the other end of the steam drum is a flanged end piece 50 which provides a communicating passage 51 between the upper and lower banks of tubes 43 and 44. The inlet header 46 is provided with a flanged pipe 55 which is attached to the pipe 20 from the ammonia stripping tower, while the gas outlet header 47 is provided with an outlet pipe 58 which is connected to a pipe 59 leading to the gas inlet 60 of the ammonia burner 31.

The ammonia burner 31 consists of an upper cylindrical gas inlet section 61 and a lower frustro-conical gas outlet section 62 which is mounted on the gas inlet header 30 of the steam drum and is preferably integral with the shell 25 thereof. A catalyst gauze which may be of platinum or platinum-rhodium is illustrated diagrammatically at 63 as being retained between the upper and lower sections 61 and 62, but it is understood that in actual practice a section containing a plurality of layers of gauze will preferably be used.

In operation the gases entering the burner through the inlet 60 are mixed in the inlet chamber 61 to insure a uniform flow through the gauzes and then pass downwardly through the catalyst screens 63 and are burned to oxides of nitrogen at temperatures of 800–850° C. The hot gases so produced are discharged directly into the inlet header 30 of the waste heat boiler and are conducted directly into the tubes 35, which are surrounded by water in the boiler space 36. During their passage through the tubes 35 the gases give up much of their heat and thereby heat the water to high temperatures. The hot water passes by thermo-syphon flow through the riser pipe or pipes 23 into the steam drum 22 where it is transformed into steam above the water level indicated on the sight glass 64. The circuit is completed by a corresponding downward flow of cooler water or condensate through the downflow pipe 24, which leads into the lower part of the boiler drum through the feed water line 65.

The operation of the preheating steam drum for controlling the temperature of the ammonia-air mixture passing to the burner is evident from a consideration of the drawing. The ammonia-air mixture of constant composition generated in the stripping tower 8 passes through the pipe 20 to the inlet header 46 of the preheating steam drum. From there it passes through the upper tube bank 43 in heat exchange relation with the steam generated by means of the heat of the hot nitric oxide gases, and by simple adjustment of the boiler pressure by means of the valve 66 in the steam line 67 the temperature of the gas mixture can be closely regulated. From the upper tube bank the gas mixture passes by way of the passage 51 through the lower tube bank 44 into the gas outlet header 47, and from there it passes by way of the pipe 59 to the inlet 60 of the ammonia burner.

From the above detailed description it will be seen that the specific modification illustrated accomplishes the objects of the invention in a new and improved manner. It should be understood, however, that in its broader aspects the invention is not limited to these details, which are for purposes of illustration only, but that suitable modifications of the process and substitutions of the apparatus may be made within the scope of the following claims.

What I claim is:

1. An ammonia oxidation system comprising in combination means for preparing an ammonia-air mixture, an ammonia burner having a gas inlet and a gas outlet, and a waste heat boiler comprising a water drum and a steam drum, the water drum being so connected with the gas outlet of the ammonia burner that the oxides of nitrogen issuing therefrom are conducted in heat exchange relation with the water in the water drum, means connecting the steam drum with the gas inlet of the ammonia burner, and means for conducting the ammonia-air mixture in indirect heat exchanging relation with the contents of the steam drum on its way to said ammonia burner.

2. An ammonia oxidation unit comprising in combination an ammonia burner and a waste heat boiler including a water drum and a steam drum, the boiler drum having a plurality of tubes so connected with the gas outlet of the burner that the oxides of nitrogen are conducted in heat exchange relation with the water in the water drum and the steam drum having a plurality of preheating tubes connected with the gas inlet of the burner and also connected with a source of supply of an ammonia-air mixture.

3. An ammonia oxidation unit comprising in combination a waste heat boiler including a water drum and a steam drum, the boiler drum having a gas inlet header at one end and a plurality of tubes extending longitudinally therefrom, an ammonia burner mounted on said header and adapted to discharge hot gases thereinto, and riser and downflow lines connecting with the steam drum, and the steam drum having a pressure regulating valve, a gas inlet header and a gas outlet header and a plurality of tubes extending therebetween, said gas outlet header being connected with the gas inlet of the ammonia burner, and said gas inlet header being connected with a source of supply of an ammonia-air mixture.

4. An ammonia oxidation unit comprising in combination a waste heat boiler including a water drum and a steam drum, the boiler drum having a gas inlet header at one end and a plurality of tubes extending longitudinally therefrom, an ammonia burner adapted to discharge hot gases into said header and riser and downflow lines connecting said boiler drum with the steam drum, said steam drum having a pressure regulating valve, a gas inlet header and a gas outlet header and a plurality of tubes extending therebetween, the gas outlet header being connected with the gas inlet of the ammonia burner and said gas inlet header being connected with a source of supply of an ammonia-air mixture.

RALPH S. RICHARDSON.